United States Patent [19]

Colucci

[11] 4,312,670
[45] Jan. 26, 1982

[54] SYSTEM FOR STRETCH CASTING FILAMENTARY SHAPED BODIES

[75] Inventor: Stephen L. Colucci, Mishawaka, Ind.

[73] Assignee: National-Standard Company, Niles, Mich.

[21] Appl. No.: 116,619

[22] Filed: Jan. 29, 1980

[51] Int. Cl.³ .................................................. B22F 3/00
[52] U.S. Cl. ........................................ 75/200; 75/211; 75/214; 75/DIG. 1; 264/111
[58] Field of Search .................. 264/111, DIG. 1; 75/200, 211, 214

[56] References Cited

U.S. PATENT DOCUMENTS

| | | |
|---|---|---|
| 3,322,865 | 5/1967 | Blaze . |
| 3,602,291 | 8/1971 | Pond . |
| 3,671,228 | 6/1972 | McIntire . |
| 3,697,262 | 10/1972 | Fenner .................... 75/214 |
| 3,705,223 | 12/1972 | Pearson . |
| 3,723,588 | 3/1973 | Economy . |
| 3,760,049 | 9/1973 | Borer et al. . |
| 3,846,527 | 11/1974 | Winter . |
| 4,010,223 | 3/1977 | Caywood, Jr. . |
| 4,071,594 | 1/1978 | Pearson et al. . |
| 4,089,921 | 5/1978 | Dobo .................. 75/DIG. 1 |
| 4,104,445 | 8/1978 | Dobo .................. 75/DIG. 1 |
| 4,118,225 | 10/1978 | Dobo ........................ 75/211 |

*Primary Examiner*—Brooks H. Hunt
*Attorney, Agent, or Firm*—Bacon & Thomas

[57] ABSTRACT

Filamentary shaped bodies, such as strands, fibers, ribbons and the like, are formed by extruding an extensible high solids forming mix through an orifice and thereafter stretch casting the mix under the force of gravity through zones of controlled environment to form a continuous filamentary body which may thereafter be separated into discrete fibers or collected in its continuous form. The preferred high solids constituent include those metallic compounds capable of undergoing reduction so that shaped bodies made therefrom may be reduced and sintered into metallic filamentary articles.

13 Claims, 5 Drawing Figures

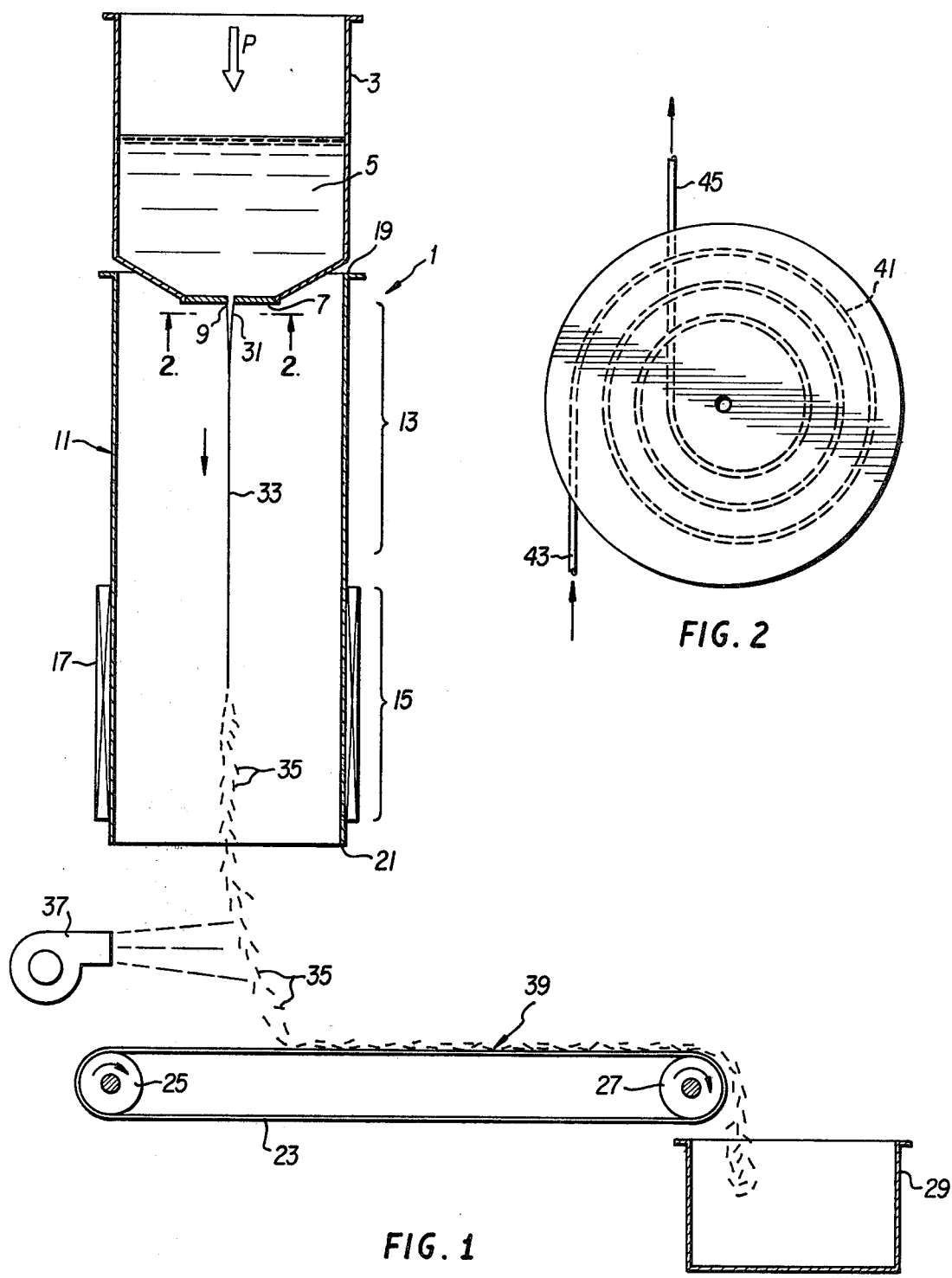

U.S. Patent   Jan. 26, 1982   Sheet 2 of 2   4,312,670
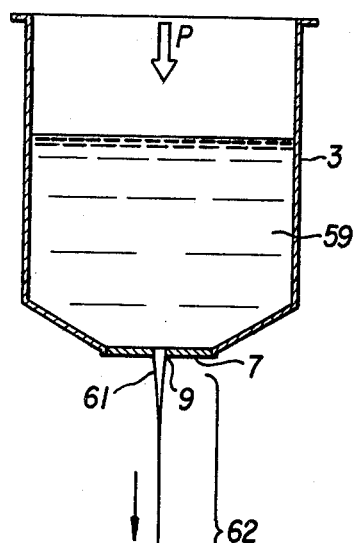
FIG. 3
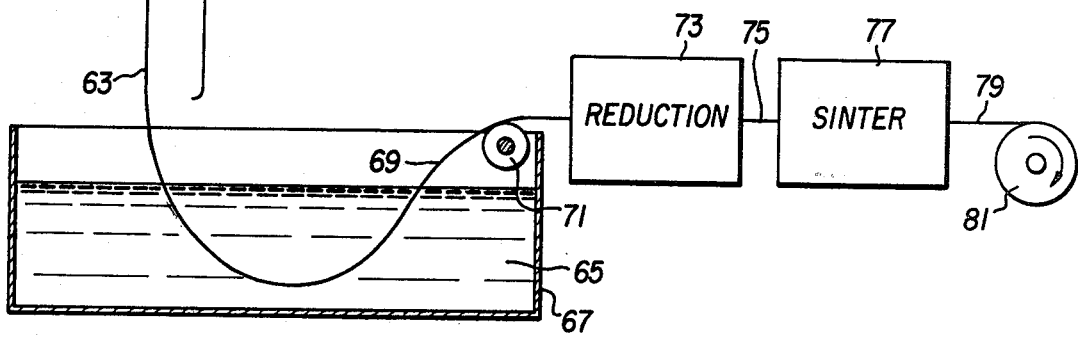
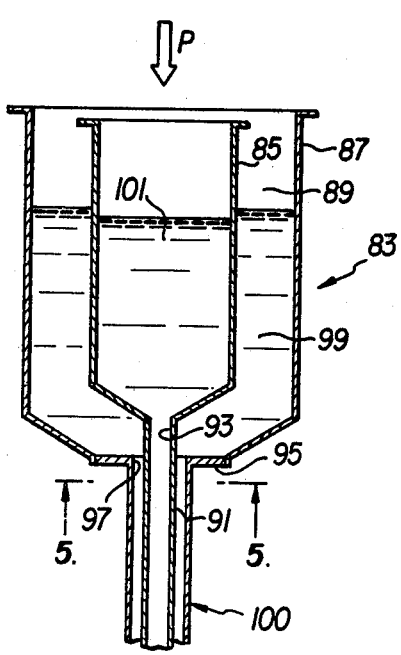
FIG. 4
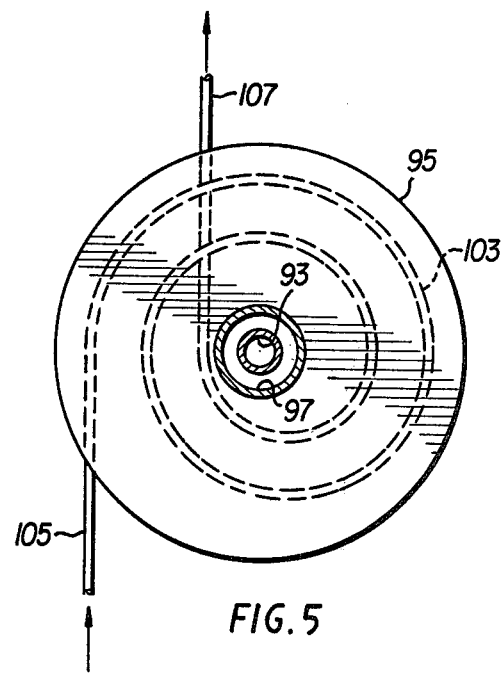
FIG. 5

SYSTEM FOR STRETCH CASTING FILAMENTARY SHAPED BODIES

BACKGROUND OF THE INVENTION

1. Field of the Invention

The present invention relates generally to the making of shaped bodies from formable composition mixes. More particularly, the invention involves the extrusion of compositions comprised primarily of inorganic compounds to produce filamentary bodies having a generally continuous and uniform configuration.

2. Description of the Prior Art

The forming of shaped bodies from compositions comprising essentially inorganic constituents has been well documented by the prior art. Of particular interest in this area of technology is the utilization of compositions that include a metallic compound which is reducible to its free metal state. This permits the shaping of the composition into the desired configuration of the final product, and thereafter reducing and sintering the shaped body to produce a metal article which only requires a minimum amount of final working or finishing. By contrast, the conventional practice of manufacturing metal articles requires the casting of molten metal either into molds of desired shapes or into ingot molds for subsequent mechanical deformation into the final desired shape. In addition to economic considerations of labor and equipment, the production of metallic articles by casting is limited both in the shapes obtainable and the mechanical properties of the cast article. These factors are especially significant in the production of metallic articles having a continuous or filamentary configuration, such as fine metal fibers, wire strands, thin metal ribbons and the like.

A system for making high density filamentary metal articles by utilizing a formable composition mix comprised primarily of inorganic constituents is disclosed by the McIntire et al U.S. Pat. No. 3,671,228. This patent discloses the making of metallic bodies from reducible metal compounds by forming agglomerates thereof by mixing fine particles of the compounds with the plasticizer or binder. The agglomerates are then compacted into the desired shapes, such as extrusion to from continuous strands or the like, and thereafter subjected to a reducing environment. The resulting free metal body is then sintered into a very dense metal product. By mixing metallic compounds of different metals in forming the compacted agglomerates, it is possible through the practice of this technique to produce sintered alloy articles for various applications. The forming compositions or agglomerates utilized by the system of this patent are necessarily of high viscosity in order to accommodate the shaping of same through molding, extruding or similar known forming techniques.

The prior art has also recognized that filamentary bodies in the form of fibers may be made by spinning or extruding compositions that are essentially ceramic or refractory particles dispersed within a carrier to define a sol or slip. Such fibers are subjected to heat treatment for the purpose of establishing a bonded refractory product, such as crystalline fibers. This technique is particularly useful for making alumina fibers or filaments and is well documented by the disclosures of the Blaze U.S. Pat. No. 3,322,865, Winter et al U.S. Pat. No. 3,846,527, Winter et al U.S. Pat. No. 4,010,233 and Pearson et al U.S. Pat. No. 4,071,594. A particular problem encountered in the production of inorganic fibers according to techniques and compositions such as disclosed by these patents is that of imparting the desired physical characteristics to the composition mix in order to accommodate forming the fibers by established techniques, such as spinning and extruding. The Winter et al U.S. Pat. No. 3,846,527 teaches that the spinnability of its composition is achieved by inclusion of a linear polymeric substance, such as a polyacrylamide. The Pearson et al U.S. Pat. No. 4,071,594 is similar in that its composition comprises primarily alumina suspended in a finely divided state with a high molecular weight linear chain polyethylene oxide polymer in an organic solvent.

Prior art techniques for forming filamentary shapes also include extruding polymer or molten metal through an orifice for collection below the extrusion orifice. For example, the Pond U.S. Pat. No. 3,602,291 discloses that discrete metal filaments may be made by extruding a stream of molten metal downwardly through a vertical tube which terminates at its lower end in a quench bath. This technique is similar to the well known procedure of forming powder or shot, but differs therefrom in that the extruded molten metal falls under the force of gravity in a continuous stream or filament and does not separate into discrete filaments until it reaches the quench bath. The Economy et al U.S. Pat. No. 3,723,588 is broadly similar in that a supply of thermoplastic material is extruded through an orifice disposed at the bottom of a vessel to form a continuous filament or fiber that is drawn downwardly and collected on a rotating spool. The polymer cools and solidifies into the fiber through contact with the atmosphere as it is being drawn downwardly and collected. The rate at which the filament is drawn is controlled by regulating the speed of rotation of the collection spool. This system is only an example of other similar known techniques for making synthetic polymer filaments, such as the melt spinning process for Nylon and similar materials which involve extruding through an orifice and then stretching to final size.

SUMMARY OF THE INVENTION

It is an object of the present invention to provide an improved system for forming filamentary shapes from compositions comprised primarily of inorganic constituents.

It is another object of the invention to provide an improved method for forming filamentary shapes having any of a multitude of cross-sectional configurations.

It is a further object of the invention to provide an efficient and economical system for making metallic articles of generally filamentary configuration, such as fibers, ribbons, strands, sheets and the like.

It is still yet another object of the invention to provide an improved system for forming filamentary shapes without the necessity of utilizing heretofore known expensive and complex apparatus and procedures.

The present invention achieves these and other objects by extruding an extensible viscoelastic composition comprised primarily of a high solids content through an orifice to form an extrudate thereof. The extrudate initially undergoes stretching under the force of gravity through a first controlled environment zone to cast a continuous filamentary body. The latter shape is then passed through a second controlled environment zone in which it is hardened to impart physical integrity and green strength thereto. The resulting filamentary shape may be broken into discrete fibers and deposited upon means for conveying the fibers through additional treatment stages, including reduction and sintering if a metallic compound comprises the primary precursor solids content in the composition mix. Alternatively, the filamentary shape may be collected as a continuous filament and passed through successive reduction and sintering stages to produce a continuous metal strand having any desired cross-sectional configuration.

Additional objects of this invention will become apparent to those skilled in the art from the following description thereof when taken in conjunction with the appended claims.

BRIEF DESCRIPTION OF THE DRAWINGS

FIG. 1 is a schematic sectional view of one embodiment of the present invention as utilized for forming discrete fibers;

FIG. 2 is a view taken along the line 2—2 of FIG. 1;

FIG. 3 is a schematic sectional view of a second embodiment of the present invention as utilized for forming a continuous strand;

FIG. 4 is a sectional view of a hopper and orifice assembly that may be utilized in the systems of either FIG. 1 or FIG. 3 for the purpose of forming coaxial filaments from two different precursor compositions; and FIG. 5 is a sectional view taken along the line 5—5 of FIG. 4.

DETAILED DESCRIPTION OF THE PREFERRED EMBODIMENTS

An apparatus 1 which may be utilized for practicing the present invention is depicted in FIG. 1 and comprises a hopper 3 for storing a supply of viscoelastic forming mix 5. The lowermost portion of hopper 3 is preferably tapered in configuration and terminates in a flat extrusion plate 7 provided with an orifice 9.

A treatment chamber 11 is disposed directly beneath hopper 3 and includes a stretch casting zone, generally designated at 13, and a drying zone, generally designated at 15. The exterior of zone 15 is surrounded by a plurality of heating units 17 which may be of the resistance type or any other type well known in the art for heating the interior of zone 15. The interior of zone 15 may comprise air, inert gases or hydrocarbon fuel products of combustion.

Chamber 11 is of an elongate configuration with its longitudinal axis being disposed substantially vertical. Chamber 11 preferably has a uniform cross-sectional configuration along the length thereof, with such configuration being circular, square, rectangular or of any suitable polygonal design. The uppermost end 19 of chamber 11 may either be opened to the ambient atmosphere or, if desired, may be sealed to the lower portion of hopper 3. The lowermost end 21 of chamber 11 is preferably opened to the ambient atmosphere.

A belt conveyor 23 supported for movement on a pair of rollers 25 and 27 is disposed directly beneath the lowermost end of chamber 11. Rollers 25 and 27 are disposed for clockwise rotation so that articles disposed on conveyor 23 may be directed to a storage container 29.

In producing filamentary articles by apparatus 1, a slight amount of pressure P is imposed and maintained continuously upon the surface of forming mix 5 contained within hopper 3. This immediately initiates extrusion of mix 5 through orifice 9 to form an initial extrudate 31 which extends downwardly from the bottom of plate 7 and is directed into compartment 13. Because mix 5 is of a viscoelastic nature, extrudate 31 immediately stretches downwardly through compartment 13, thereby stretch casting itself under the force of gravity into a continuous filament 33. When filament 33 reaches the lowermost end of zone 13, it has undergone stretch casting to substantially its final cross-sectional area, the latter being controlled by lengthening or shortening the residence time of filament 33 within zone 13. The environment within zone 13 is maintained at ambient room or cooler temperature in order to retain the viscoelastic or extensible characteristic of mix 5 during the entire residence time of filament 33 in zone 13. Therefore, the vertical length of compartment 13 essentially defines a controlled environment stretch casting zone.

When filament 33 passes into zone 15, it immediately begins hardening through drying, thereby terminating stretch casting of filament 33 and imparting physical integrity and green strength thereto. Depending upon the specific constituents utilized in forming mix 5, zone 15 may be maintained anywhere from ambient room to high oven temperatures. The overall vertical length of zone 15 therefore defines a controlled environment drying zone.

However, it is understood that under certain circumstances, it may be deemed desirable to eliminate zone 13 altogether and pass extrudate 31 directly into zone 15 within which it is both stretch cast and dried into filament 33.

At the lower portion of zone 15, filament 33 breaks apart and separates into a plurality of discrete filamentary fibers 35. Upon exiting through open end 21 of chamber 11, fibers 35 may be subjected to pressurized fluid current, such as produced by an air blower 37. This serves to direct fibers 35 laterally for collection upon conveyor 23 and which are subsequently deposited into container 29. At this point, heavier waste particles of mix 5 continue to fall vertically in the downward direction for removal by any appropriate collection means. As fibers 35 are deposited on conveyor 23, it is apparent that they form and define a fibrous layer, indicated generally at 39. The thickness of layer 39 can be varied by varying the speed of conveyor 23. In this manner, layer 39 can be compressed, if desired, and directed into successive treatment stations, such as reduction and sintering furnaces to produce a fibrous metal mat, if metal oxides are used in mix 5, rather than be collected as discrete fibers. However, fibers 35 collected freely within container 29 may also be subsequently reduced and sintered to produce discrete free metal fibers that are suitable for a variety of uses.

The structure of extrusion plate 7 is shown in FIG. 2. A helical passageway 41 may be disposed internally of plate 7 for the purpose of circulating coolant therethrough. A coolant inlet 43 and a coolant outlet 45 are provided for this purpose. Accordingly, plate 7 can then be maintained at any desired temperature to prevent mix 5 from solidifying and plugging orifice 9. The circulated coolant may be water or any other liquid deemed suitable for the practice of this invention.

A second embodiment of the invention is depicted in FIG. 3 wherein an extensible forming mix 59 comprising a crosslinkable binder agent and high solids content is disposed within hopper 3 for extrusion through orifice 9 of extrusion plate 7 under the initial application of a slight pressure P on the surface of mix 59. An extrudate 61 issuing from orifice 9 is subjected to stretch casting under the force of gravity through a first stretch casting zone, designated generally at 62 and having preferably an ambient or room temperature atmosphere environment. This forms a continuous filament 63 which, at the end of the stretch casting zone, is directed into a second controlled environment zone comprising a chemical crosslinking solution 65 contained within a vat 67. Solution 65 may be any chemical deemed suitable for effecting rapid and complete crosslinking of the binding agent utilized in mix 59.

Immediately upon entering solution 65, the exterior surface of filament 63 hardens due to the crosslinking action, with such hardening progressing inwardly towards the central portion of filament 63. The residence time of filament 63 within solution 65 determines the extent of crosslinking which, desirably, should be complete so that a fully crosslinked strand 69 issues from bath 65.

Strand 69 is preferably quite rubbery in nature and has sufficient flexibility to permit the directing of same by suitable guide means 71, such as a roller or the like, into a reduction furnace 73 containing an atmosphere capable of reducing precursor metallic compounds contained within mix 59 to their respective free metal states. This serves to produce a porous metallic strand 75 which is then directed into a sinter furnace 77, the latter being maintained at sufficient temperature to effect sintering and densification of the free metal particles making up strand 75. Furnace 77 produces a dense metal strand 79 which is in turn stored upon a collection roll 81.

A modified hopper and extrusion assembly 83 is depicted in FIG. 4 for use in practicing either of the above described embodiments of the invention. Assembly 83 includes an internal hopper 85 disposed within a larger external hopper 87 and defining an annular compartment 89 therewith. The lowermost end of hopper 85 terminates in an extrusion tube 91 which defines an extrusion orifice 93. Hopper 87 terminates in an extrusion plate 95 having an extrusion orifice 97 therein. The outer diameter of tube 91 is smaller than the diameter of orifice 97, with orifices 93 and 97 being coaxially disposed and isolated from each other by tube 91. The lowermost end of the tube 91 is substantially coplanar with the lowermost surface of plate 95. By virtue of this arrangement, a viscoelastic mix 99 having a first composition may be disposed within annular compartment 89 and a viscoelastic mix 101 having a second and different composition may be disposed within hopper 85 for simultaneous extrusion through corresponding respective orifices 97 and 93. The resulting composite extrudate 100 may then be subjected to either the combined stretch casting and drying treatments depicted in FIG. 1 to form fibers or, alternatively, may be subjected to the stretch casting and solution hardening treatments depicted in FIG. 2 to form a continuous composite strand.

As shown in FIG. 5, plate 95 may include a helical passageway 103 for circulating coolant received through an inlet 105 and passed through an outlet 107. This serves to maintain fluidity in mixes 99 and 101 as they are extruded out orifices 93 and 97.

The composition of the forming mix for use in the practice of this invention is preferably aqueous-based and of a viscoelastic nature, i.e. having rheological characteristics which permit the mix to extend or stretch into a continuous filament. This is critical since the method of the invention requires that stretching of the mix during the stretch casting phase occur substantially only under the force of gravity. The application of slight pressure above the surface of the mix supply serves to initiate and maintain extrusion of the mix through the orifice to form an extrudate which, under the force of gravity, stretches downwardly into a continuous filament, the final diameter or cross-sectional area of which being controlled by the vertical distance of the stretch casting zone.

Forming mixes proven to be highly advantageous in the practice of the invention include those of aqueous-base and formed substantially of inorganic constituents, particularly metallic compounds capable of undergoing reduction to their respective free metal states. Such compounds may include the oxides of Fe, Co, Ni, Cu, Cr, Mo, W and Mn. The insoluble chlorides of Cu, Cr, Mo and W and the sulfides of Cu, Fe, Ni, Co and Mo may also be utilized to advantage in the practice of the invention. Moreover, any other metallic compound capable of being reduced and sintered as disclosed by the aforementioned McIntire U.S. Pat. No. 3,671,228 may also be utilized, the entire disclosure of this patent being herewith incorporated by reference thereto.

The more significant metal compounds making up the forming mix for use in the practice of the invention comprise the oxides since these compounds are the most plentiful and exist not only in natural ore concentrates, but are also readily available as by-products of manufacturing. Iron oxides in the form of $Fe_2O_3$ and $Fe_3O_4$ are particularly useful because they are easily reduced in hydrogen or carbon monoxide atmospheres. Moreover, these iron oxides are relatively pure and inexpensive, as well as being readily obtainable from a variety of sources.

Forming mix compositions that are especially useful for the practice of the invention may include those disclosed by U.S. Application Ser. No. 52,010, which application shares a common assignee with the instant application. The essential characteristic of this composition is its "pourability", with the composition being substantially defined by a high solids content and also containing minor amounts of a dispersing agent, a crosslinking agent and a binder agent, with water making up the balance.

EXAMPLE I

The following is an example of a forming mix that is suitable for use in the practice of the invention, with the percentages being by weight of the total composition:

| | |
|---|---|
| Solids ($Fe_2O_3$) | 75% |
| Dispersant (Tamol 850) | 1.0% |
| Crosslinking agent (Ammonium borate) | 0.5% |
| Binder agent (Sodium Carboxymethyl-hydroxypropyl Cellulose) | 0.5% |
| Water | balance |

The solids, dispersant and crosslinking agent were initially mixed with water by means of a high shear mixer. This serves to wet the solids, break up agglomerates and render the mixture uniform. The pH was adjusted to approximately 6.5–6.7 with a 50% solution of HCl in water. The binder was in the form of dry powder and hence difficult to wet. The powder was dispersed throughout the mixture to achieve dissolution in the mix through hydration. A low shear mixing rate was used after dispersion of the powder to render the mixture uniform, with the actual mixing time being dependent upon the type of solids used in the mix. It is critical that hydration of the binder occur after dispersion within the mix in order to provide the proper uniform viscosity which renders the mix both pourable and extensible. The resulting mix was then extruded, stretch cast and dried according to the invention.

The following comprise additional examples of the invention wherein iron oxide filaments were produced from aqueous-based forming mixes.

EXAMPLE II

76% Iron Oxide in deionized water (BET=4.4 pH-6.7)
2% (of oxide weight) Tamol 850 (dispersant)
0.6% (of oxide weight) sodium carboxymethylhydroxypropyl cellulose (binder)
63% (of binder weight) ammonium borate (crosslinking agent)

EXAMPLE III

72% Iron Oxide in deionized water (BET=8.7)
3% (of oxide weight) Tamol 850 (dispersant)
0.5% (of oxide weight) sodium carboxymethylhydroxypropyl cellulose (binder)
63% (of binder weight) ammonium borate The filaments were produced from mixes of EXAMPLES II and III in accordance with the following operating parameters.

| Example | Drying Temp °F. | Air Pres. psig | Orifice diam. (inch) | Fiber diam. (inch) |
|---|---|---|---|---|
| II | 300 | 4 | .046 | .0025 |
| II | 324 | 24 | .035 | .0025 |
| III | 300 | 34 | .035 | .003 |
| III | 300 | 32 | .046 | .0041 |

It has been found that an acceptable viscoelastic composition should contain from approximately 60-80% solids, with a higher solids content providing a rougher or matte finish to the shaped filament. A lower solids content provides correspondingly smoother exterior finishes to the stretched filament. In the context of this invention, a higher solids content is one greater than about 70% by weight, while a lower solids content is one that is less than approximately 70% by weight of the total composition.

The actual forming of the shaped filament according to the invention can be controlled in accordance with several operating variables. The size of the extrusion orifice determines the diameter, weight and cross-sectional configuration of the initial extrudate and, thus, the final diameter and cross-sectional configuration of the shaped filament at the end of the stretch casting zone. Moreover, the method of this invention can be used to produce filaments having varied cross-sectional configurations, including circular, oval, square, rectangular and "dog-bone" or lobed. An extrusion plate having multiple orifices may also be utilized to permit the stretch casting of plural filaments, thereby greatly enhancing production rates for commercial applications.

The temperature of the initial mix maintained in the supply hopper can also be varied to control the viscosity of the mix being extruded. Generally speaking, ambient and lower temperatures impart greater viscosity to the mix and maintain its fluidity for a longer period of time as it passes through the stretch casting zone. In this regard, the pressure applied to the surface of the mix supply can be varied to accommodate the viscosity of the mix itself in initiating and maintaining extrusion.

The vertical length of the stretch casting zone determines the final diameter or cross-sectional area of the formed filament at the end of the zone, the point at which additional stretching is no longer desired. The temperature within the stretch casting zone is generally maintained at ambient room or lower temperatures.

The length of residence time during which the stretched filament is maintained in the drying zone and the temperature of the zone also has a bearing upon the physical characteristics of the shaped filamentary body. A more brittle filament is produced with an increase in both residence time in the drying zone and temperature. For the aforementioned mixes, a temperature of around 300° F. is quite suitable, with the compartment defining the drying zone being heated with a resistance heater attached to the outside walls thereof, thereby producing an oven type heating compartment. The interior size of the heating compartment also has a bearing upon the evenness of temperature control with smaller compartments providing less temperature gradients than larger compartments.

The practice of the present invention can be varied to produce all types of filamentary products. For example, short lengths of fibers may be subjected to vibrational treatment in order to break them up into even shorter lengths for subsequent reduction and sintering. The fibers may also be mechanically chopped to the desired length and the ends thereof can be shaped to form "dog bones" or staples prior to reduction and sintering. In this manner, reinforcing elements can be produced for use in strengthening concrete and other matrices.

In making wire, according to the embodiment depicted in FIG. 3, no heating zone is required and the filamentary product is directed immediately into a chemical hardening solution for a complete crosslinking of the binder agent. Under certain circumstances, the stretch casting zone may be minimized or eliminated altogether so that the extrudate can be received directly into the solution with little or no stretching.

The reduced and sintered filamentary products produced through this invention have a multitude of practical commercial applications. For example, the straight fibers can be incorporated in friction brake linings. The fibers can also be used for plastic reinforcement, especially when steel fibers are produced which have the desired ductility and modulus of elasticity. Through selective use of the precursor metallic compounds, products having desired magnetic and electrical characteristics can also be produced economically and efficiently through the practice of this invention.

It will be understood by those skilled in the art that the embodiments of the invention shown and described hereinabove are only preferred examples of same and are subject to other modifications without departing from the scope and spirit of the invention.

I claim:
1. A method of forming filamentary-shaped bodies comprising the steps of:
   (a) providing a viscoelastic forming mix comprised of a major portion of at least one particulate metallic compound capable of undergoing reduction to its free metal state,
   (b) pressurizing the mix to extrude same through an orifice to form an extrudate thereof,
   (c) stretching the extrudate under substantially only the force of gravity to reduce its cross-sectional area and cast the extrudate into a continuous filamentary body having a desired uniform cross-sectional area, and (d) hardening the continuous filamentary body to impart green strength thereto.

2. The method of claim 1 wherein:
(a) the stretching of the extrudate is accomplished within a first environment zone, and
(b) the hardening of the filamentary body is accomplished in a second environment zone.

3. The method of claim 2 wherein the first environment zone comprises substantially air maintained at a temperature of from about 40°–80° F.

4. The method of claim 2 wherein the second environment zone comprises a gas selected from the group consisting of air, inert gases, hydrocarbon fuel products of combustion and mixtures thereof, with the zone being maintained at a temperature of from about 300°–500° F.

5. The method of claim 2 wherein the second environment zone comprises a polyvalent liquid selected from the group consisting of ferric chloride, ferrous chloride, nickel chloride, cupric chloride, nickel acetate, zinc acetate and mixtures thereof.

6. The method of claim 1 wherein the stretching of the extrudate and hardening of the filamentary body are accomplished substantially simultaneously within a single environment zone.

7. The method of claim 6 wherein the single environment zone comprises a gas selected from the group consisting of air, inert gases, hydrocarbon fuel products of combustion and mixtures thereof, with the zone being maintained at a temperature of from about 300°–500° F.

8. The method of claim 1 wherein the particulate metallic compound is selected from the group consisting of the oxides of Fe, Co, Ni, Cr, Cu, Mn, Mo and W, the insoluble chlorides of Cu, Cr, Mo and W or the sulfides of Cu and Fe, and mixtures thereof.

9. The method of claim 1 wherein the particulate metallic compound comprises approximately 60%–80% by weight of the total mix, with the balance including a binder, a dispersant and water.

10. The method of claim 1 further including the step of separating the hardened filamentary body into discrete sections.

11. The method of claim 10 further including the steps of:
(a) reducing the metallic compound to a free metal state, and
(b) sintering the free metal to form dense metallic fibers from the discrete sections.

12. The method of claim 1 wherein the viscoelastic forming mix comprises two separate and different compositions which are coextruded to form a composite extrudate.

13. A method of forming a filamentary-shaped body from a viscoelastic forming mix comprising extruding the mix to form an extrudate thereof, and thereafter stretching the extrudate under substantially only the force of gravity to reduce its cross-sectional area and cast the extrudate into a continuous filamentary body having a desired uniform cross-sectional area.

* * * * *